Figures 1, 2:
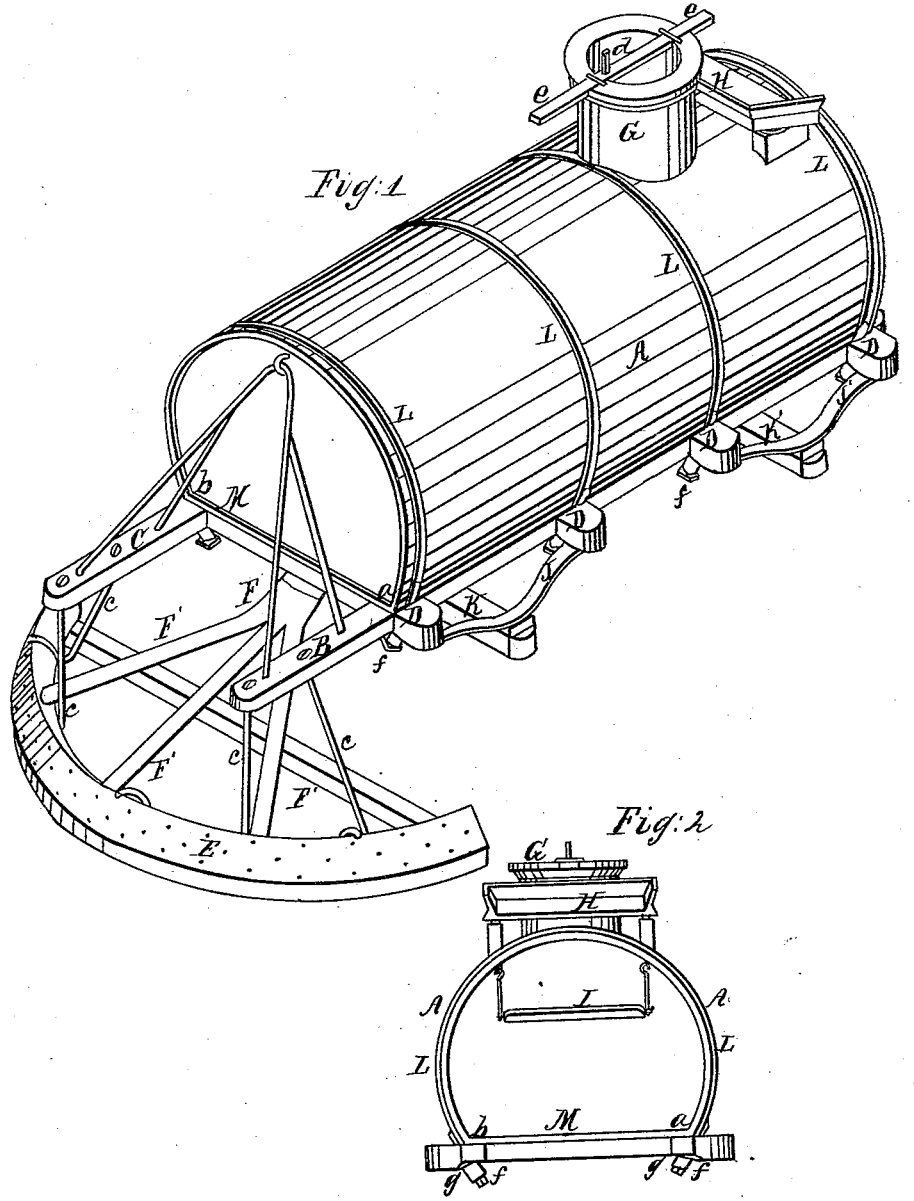

L. F. Bancroft.

Street Sprinkler.

N° 53,557.        Patented Apr. 3, 1866.

Witnesses
Thos. H. Dodge
H. L. Fuller

Inventor
L. F. Bancroft

UNITED STATES PATENT OFFICE.

L. F. BANCROFT, OF WORCESTER, MASSACHUSETTS.

IMPROVEMENT IN STREET-SPRINKLERS.

Specification forming part of Letters Patent No. 53,557, dated April 3, 1866.

*To all whom it may concern:*

Be it known that I, L. F. BANCROFT, of the city and county of Worcester, and State of Massachusetts, have invented certain new and useful Improvements in Street-Sprinklers; and I do hereby declare that the following is a full, clear, and exact description of the same, reference being had to the accompanying drawings, forming a part of this specification, in which—

Figure 1 represents a perspective view of my improved street-sprinkler, and Fig. 2 represents a front view.

In the drawings, A represents the reservoir or water-receptacle, which is of circular form from $a$ up and over to $b$ and flat on the bottom. The water-receptacle A rests upon a frame composed of the longitudinal timbers B and C and cross-timbers D D D D.

E is the sprinkling-chamber, which is supported by stay-rods $c\ c\ c\ c$ from the projecting ends of the timbers B and C. The water passes to the sprinkling-chamber through the branch-pipes F' F' F' of pipe F.

G is the turret or dome through which the water is passed to fill the receptacle A. H is the operator's seat, and I his foot-board. $d$ is a valve-rod connected with slide $e$, by means of which the driver can open and close the valve to let on or shut off the water from pipe F.

The cross-timbers extend by or project at each side, so that springs J J' can be applied to support the water-receptacle A outside of the latter, as fully indicated in the drawings, thus enabling the same to be supported in a secure and easy manner. The front set of springs, J', one on each side of the receptacle A, rests upon the rocker timber or piece K', which is to be secured to the axle of the wagon or running part.

Water-sprinklers for street use as heretofore constructed have been very objectionable, one of the most objectionable features being a constant liability to leak, whereby the running-gear of the wagon, upon which the water-receptacle is mounted, soon rots and breaks, thus involving a constant expense for repairs. Again, with the box form of water receptacle or reservoir, the motion of the water in passing over pavements and uneven streets is so violent that the sides, ends, and top of the reservoir soon give out.

By the form and mode of construction of my water-reservoir all liability to leak is avoided, since if the joints begin to loosen at all they can be quickly tightened up by the nuts $f$ on the clamping-bands L, which pass around the water-receptacle A and thence through the ends of the cross-pieces D, to receive the washers $g$ and nuts $f$. The top of the water-receptacle A being arched and tight the water does not have the injurious effect upon it as it would if the sides were perpendicular and the top flat.

The carriage or wheel part, upon which the reservoir A is mounted, can be turned quite short round, since the front wheels may be turned in under the reservoir.

The body A can be made of strips tongued and grooved or with plain joints. It will be observed that the form is such that by turning up the nuts $f$ the bottom M is tightened as well as the arched or circular part of A.

The bed-piece K is attached to the rear axle of the wagon.

Having described my improved street-sprinkler, what I claim therein as my invention, and desire to secure by Letters Patent, is—

Making the upper part of the water-reservoir A circular and the bottom flat, in combination with the use of the clamping-bands L and tightening-nuts $f$.

L. F. BANCROFT.

Witnesses:
THOS. H. DODGE,
H. L. FULLER.